United States Patent
Hsiao

(10) Patent No.: US 9,495,146 B2
(45) Date of Patent: Nov. 15, 2016

(54) HOST AND METHOD OF UPGRADING CONNECTION MANAGER OF DONGLES

(71) Applicant: HON HAI PRECISION INDUSTRY CO., LTD., New Taipei (TW)

(72) Inventor: Chung-Yu Hsiao, New Taipei (TW)

(73) Assignee: HON HAI PRECISION INDUSTRY CO., LTD., New Taipei (TW)

(*) Notice: Subject to any disclaimer, the term of this patent is extended or adjusted under 35 U.S.C. 154(b) by 197 days.

(21) Appl. No.: 14/341,143

(22) Filed: Jul. 25, 2014

(65) Prior Publication Data
US 2015/0033003 A1    Jan. 29, 2015

(51) Int. Cl.
| G06F 9/00 | (2006.01) |
| G06F 9/44 | (2006.01) |
| G06F 3/00 | (2006.01) |
| G06F 13/00 | (2006.01) |
| G06F 9/445 | (2006.01) |
| G06F 13/40 | (2006.01) |

(52) U.S. Cl.
CPC ............ *G06F 8/665* (2013.01); *G06F 8/71* (2013.01); *G06F 8/65* (2013.01); *G06F 9/445* (2013.01); *G06F 13/4068* (2013.01)

(58) Field of Classification Search
CPC ........ G06F 8/65; G06F 8/71; G06F 13/4068; G06F 8/665; G06F 9/445
USPC ................ 713/1; 717/168–173; 710/13, 301
See application file for complete search history.

(56) References Cited

U.S. PATENT DOCUMENTS

| | | | |
|---|---|---|---|
| 6,990,659 B1* | 1/2006 | Imai | G06F 3/1204 709/242 |
| 7,904,895 B1* | 3/2011 | Cassapakis | G06F 8/665 711/115 |
| 2004/0199911 A1* | 10/2004 | Lo | G06F 8/665 717/171 |
| 2005/0144612 A1 | 6/2005 | Wang et al. | |
| 2006/0117312 A1* | 6/2006 | Seo | G06F 9/4415 717/168 |
| 2006/0234632 A1* | 10/2006 | Lin | H04W 8/245 455/41.2 |
| 2006/0253620 A1* | 11/2006 | Kang | G06F 3/0623 710/36 |
| 2006/0282653 A1 | 12/2006 | Chu et al. | |
| 2007/0169104 A1* | 7/2007 | Morita | G06F 8/65 717/170 |
| 2013/0179559 A1* | 7/2013 | Chen | G06F 8/65 709/224 |

FOREIGN PATENT DOCUMENTS

| | | |
|---|---|---|
| CN | 1540497 A | 10/2004 |
| CN | 100514293 C | 7/2009 |
| TW | 200521846 A | 7/2005 |
| TW | 200705227 A | 2/2007 |

* cited by examiner

*Primary Examiner* — Ji H Bae
(74) *Attorney, Agent, or Firm* — Zhigang Ma

(57) ABSTRACT

A host device with a function dongle includes a first connection manager and a first version file. The host upgrades the first connection manager and the first version file. The host gets a second version file which is saved in the dongle. The dongle includes a second connection manager corresponding to the second version file. The host determines whether the upgraded first connection manager is newer than the second connection manager according to the upgraded first version file and the second version file. The host upgrades the second connection manager if the upgraded first connection manager is newer than the second connection manager.

8 Claims, 6 Drawing Sheets

HOST AND METHOD OF UPGRADING CONNECTION MANAGER OF DONGLES

FIELD

Embodiments of the present disclosure generally relate to upgrading firmware.

BACKGROUND

Dongles, such as BLUETOOTH® dongles, USB (Universal Serial Bus) dongles, and television dongles, with different functions, are common today. The dongles may need to be connected to a host for the execution of the functions. The host may need to install a connection manager (hereinafter "CM") for the dongles. Currently, the CM is saved in the dongle as a package and cannot be upgraded. When there is a new version of the CM, the host cannot install the newest version for the dongle and may have to upgrade the CM from the Internet. Additionally, in this situation, when the dongle connects with another host, the other host also cannot get the newer version from the dongle and may has also have to upgrade the CM from Internet.

DETAILED DESCRIPTION

The embodiments are illustrated by way of example and not by way of limitation in the figures of the accompanying drawings in which like references numerals indicate similar elements. It should be noted that references to "an" or "one" embodiment in this disclosure are not necessarily to the same embodiment, and such references can mean "at least one."

In general, the word "module" as used hereinafter refers to logic embodied in hardware or firmware, or to a collection of software instructions, written in a programming language such as, for example, Java, C, or assembly. One or more software instructions in the modules may be embedded in firmware such as in an erasable-programmable read-only memory (EPROM). It will be appreciated that the modules may comprise connected logic units, such as gates and flip-flops, and may comprise programmable units, such as programmable gate arrays and processors. The modules described herein may be implemented as either software and/or hardware modules and may be stored in any type of computer-readable medium or other computer storage device.

Figure 1:
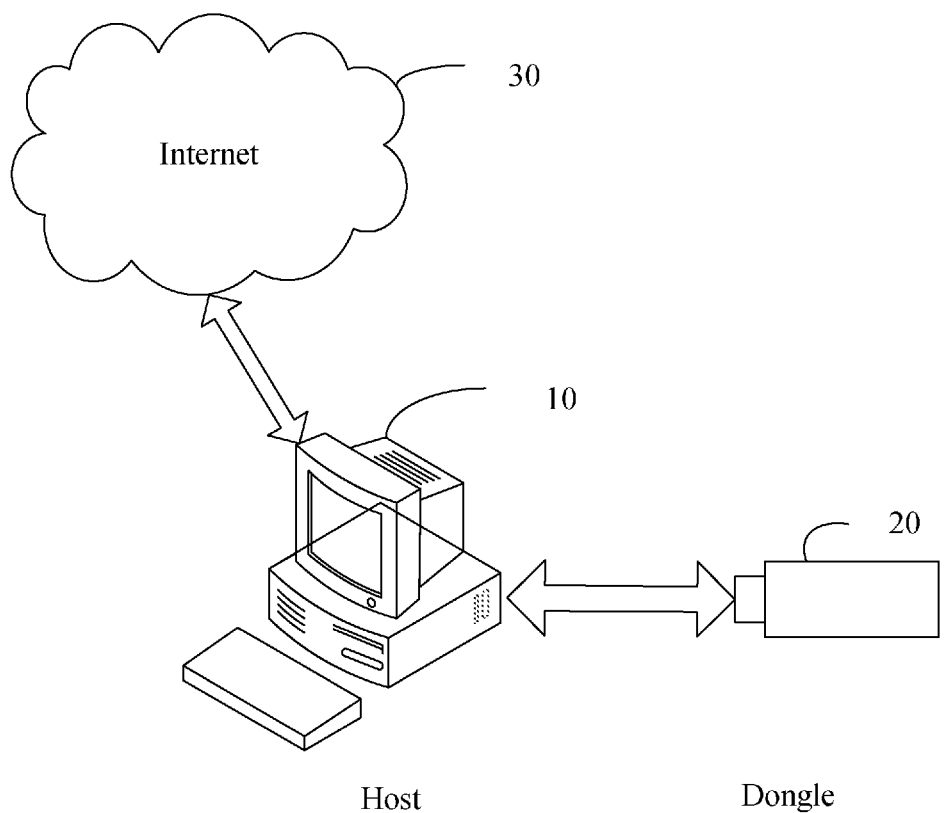
FIG. 1 illustrates an application environment of a host device.

FIG. 1 illustrates an embodiment of an application environment of a host 10. In the present embodiment, the host 10 can connect to a dongle 20 and a network 30. According to a connection between the host 10 and the dongle 20, the host 10 can upgrade a connection manager (CM) of the dongle 20.

Figure 2:
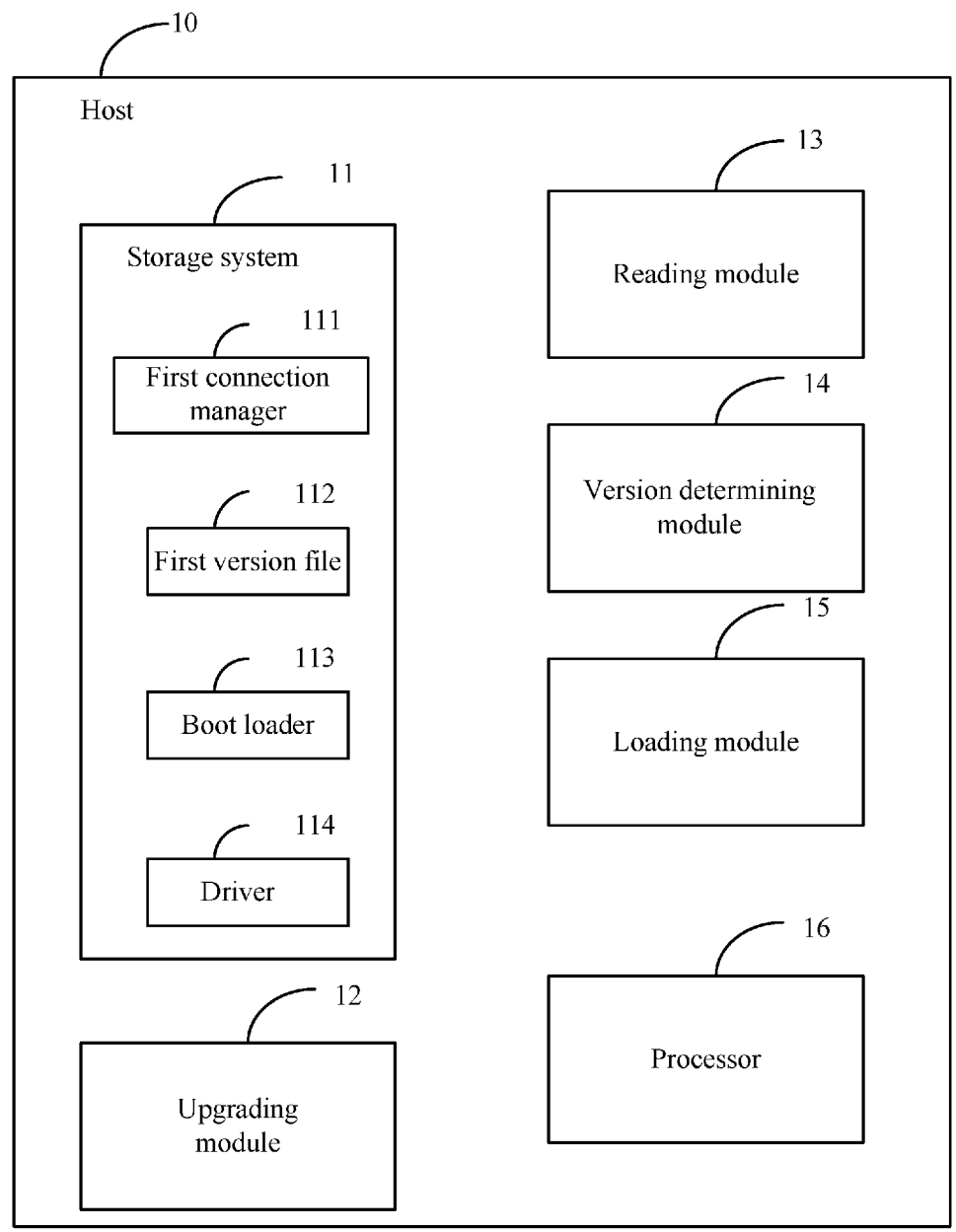
FIG. 2 is a block diagram of an embodiment of function modules of the host device.

Referring to FIG. 2, the host 10 comprises a first CM 111 and a first version file 112. The first version file 112 corresponds to the first CM 111. The host 10 also includes a universal boot loader 113 (hereinafter "u-boot") and a driver 114.

Figure 3:
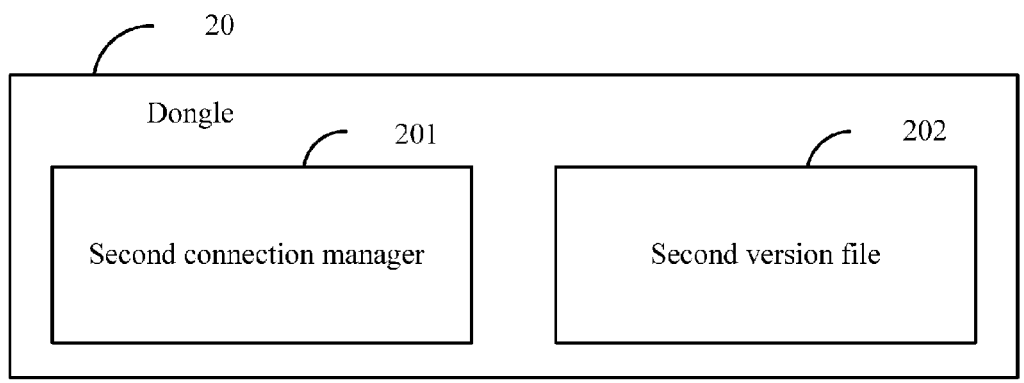
FIG. 3 is a block diagram of a dongle.

Referring to FIG. 3, the dongle 20 comprises a second CM 201 and a second version file 202 corresponding to the second CM 201. In the present embodiment, the first CM 111 is used to determine whether the second version file 202 of the dongle 20 matches the first version file 112 of the host 10. The first version file 112 is used to record version information of the first CM 111, such as the version number and version type of the first CM 111. Similarly, the second version file 202 is used to record version information of the second CM 201. In the present embodiment, once the dongle 20 is connected to the host 10 and the second version file 202 is determined as matching the first version file 112, the driver 114 can run the dongle 20. When the second version file 202 does not match the first version file 112, the u-boot 113 can be downloaded into the dongle 20, so that the second version file 202 can be updated.

In the present embodiment, if the host 10 does not have a CM corresponding to the dongle 20, the host 10 can use the second CM 201 of the dongle 20 as the first CM 111. When the CM 201 of the dongle 20 has a new version, the host 10 can download an updated first CM 111 from the Internet 30, and update the second CM 201 of the dongle 20. When the dongle 20 with the updated second CM 201 connects to another host, the other host can directly get the newer CM from the dongle 20 and does not need to download the newer CM from the Internet 30. In the present embodiment, the host 10 can be a desktop, a notebook, a tablet computer, or the like. The dongle 20 can be a BLUETOOTH® dongle, a USB (Universal Serial Bus) dongle, a television dongle, or the like.

As shown in FIG. 2, the host 10 comprises a storage system 11, an updating module 12, a reading module 13, a version determining module 14, a loading module 15, and a processor 16.

The modules 12-15 can comprise one or more software programs in the form of computerized codes stored in the storage system 11. The computerized codes include instructions executed by the processor 16 to provide functions for the modules 12-15.

The upgrading module 12 upgrades the first CM 111 and the first version file 112 from the Internet 30. In the present embodiment, providers of the dongle 20 will periodically provide a new version of CM corresponding to the dongle 20, so the first CM 111 and the first version file 112 periodically need to be upgraded.

The reading module 13 obtains the second version file 202 corresponding to the second CM 201. In the present embodiment, the dongle 20 has the second version file 202 and the second CM 201, and the second version file 202 comprises version information of the second CM 201. In the present embodiment, the dongle 20 comprising the second CM 201 and the second version file 202 can be called CD-Less dongle.

The determining module 14 determines whether the upgraded first CM 111 is newer than the second CM 201 according to the upgraded first version file 112 and the second version file 201. In the present embodiment, the first version file 112 comprises version information of the first CM 111, and the second version file 201 comprises version information of the second CM 201, such as the respective version numbers and the version types of the first CM 111 and the second CM 201.

The loading module 15 upgrades the second CM 201 on condition that the upgraded first CM 111 is newer than the second CM 201.

In the present embodiment, the loading module 15 loads the u-boot 113 to the dongle 20. When the u-boot 113 is executed, the dongle 20 stops running. When the dongle 20 stops running, the second CM 201 can be upgraded. In the present embodiment, the loading module 15 also generates an instruction to upgrade the second CM 201, then the host 10 upgrades the second CM 201 according to the instruction.

In the present embodiment, the loading module 15 determines whether the first CM 111 is an engineer version which is offered to engineers according to the first version file 112. When the first CM 111 is not an engineer version, the upgrading instruction is to copy the first CM 111 to the dongle 20, then the u-boot 113 of the dongle 20 copies the first CM 111 to the dongle 20 as the second CM 201.

In the present embodiment, when the first CM 111 is an engineer version, the upgrading instruction is to open a web page corresponding to the first CM 111 or the second CM 201, then the user can upgrade parts of the second CM 201 selectively from the Internet 30.

Figure 4:
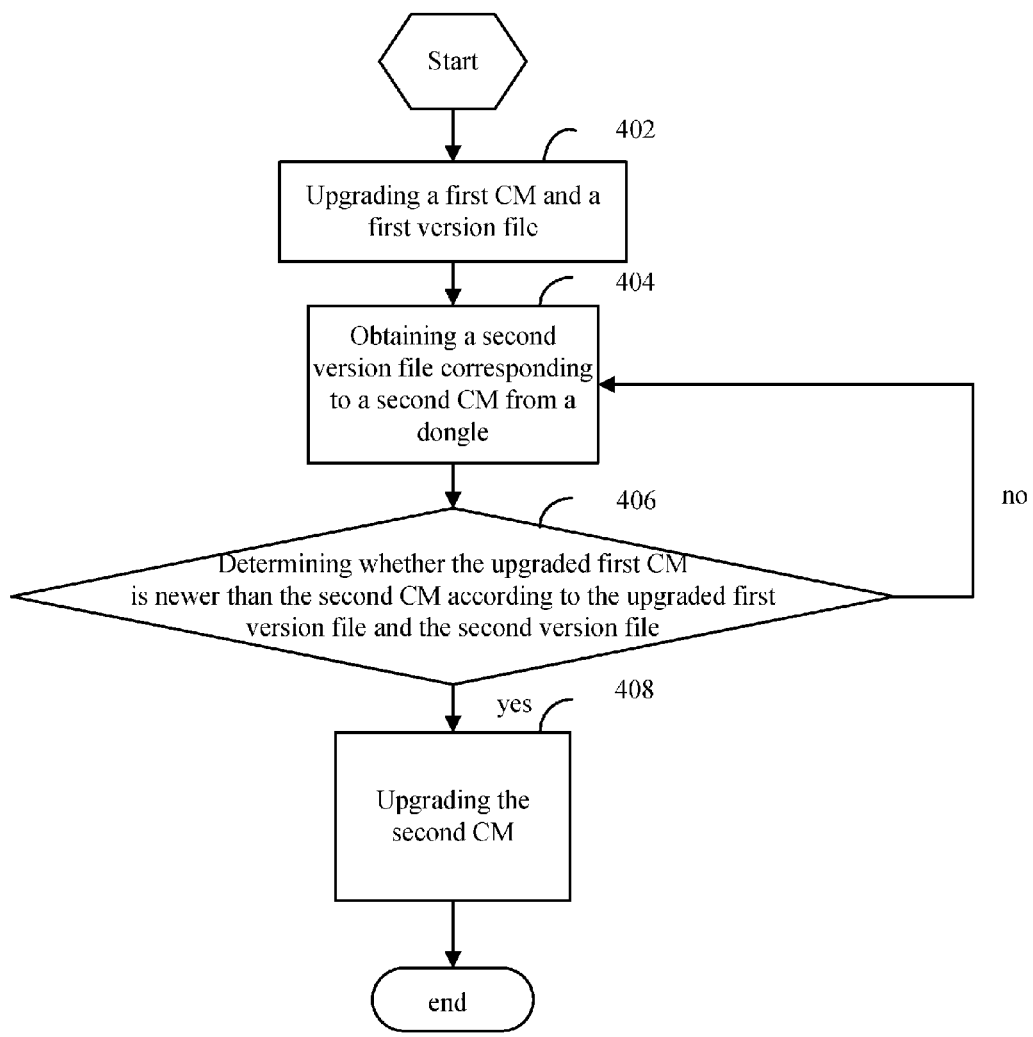
FIG. 4 is a flowchart of an embodiment of a method of upgrading a CM of the dongle.

FIG. 4 is a flowchart of an embodiment of a method of upgrading CM of the dongle 20. In the embodiment, the method is implemented in the application environment of FIG. 1 and executed by the host 10.

In block 400, an upgrading module upgrades a first CM and a first version file from the Internet. In the present embodiment, a host has the first CM and the first version file. In addition, a dongle comprises a second CM and a second version file. In the present embodiment, when the dongle is first connected to a host, the host can get the second CM from the dongle as the first CM.

In block 402, a reading module obtains the second version file corresponding to the second CM from the dongle.

In block 404, a determining module determines whether the upgraded first CM is newer than the second CM.

In block 406, a loading module upgrades the second CM on condition that the upgraded first CM is newer than the second CM.

Figure 5:
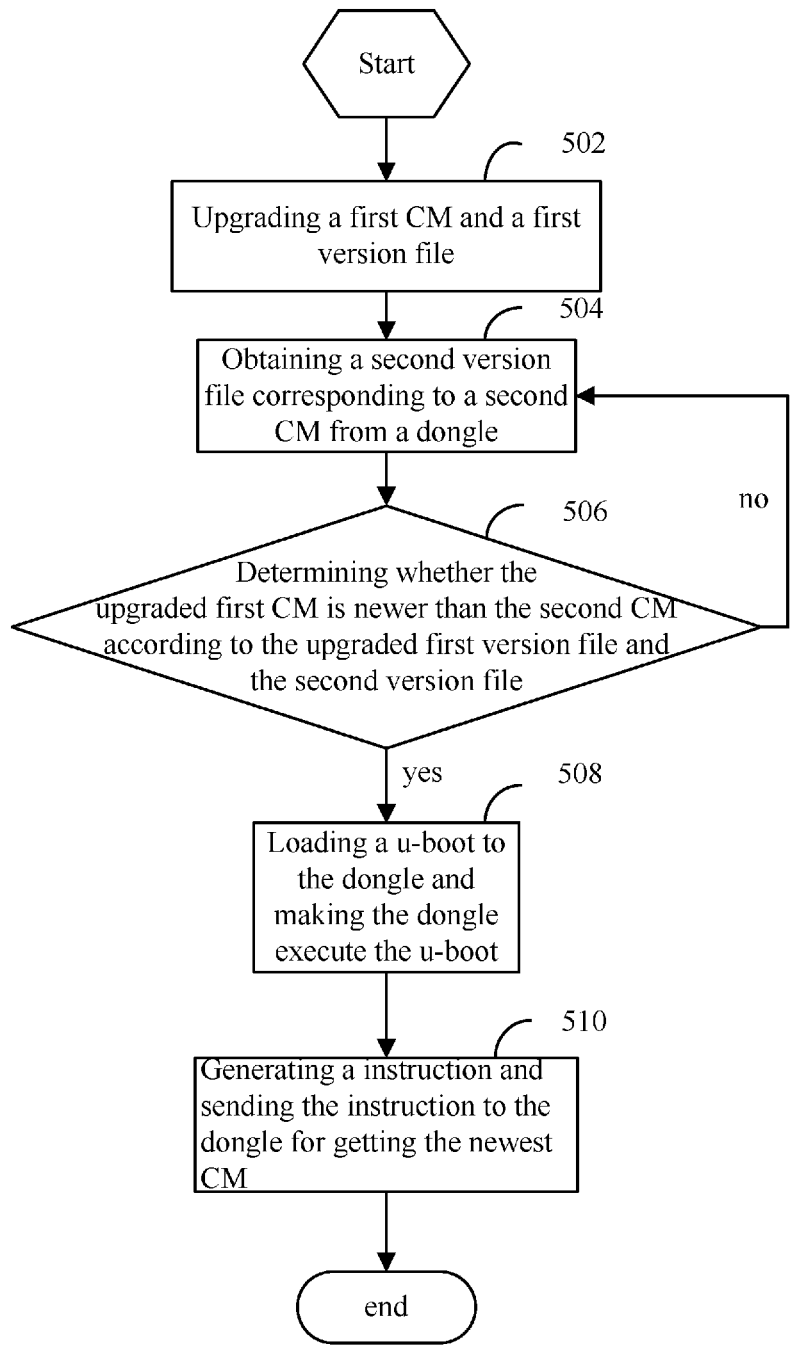
FIG. 5 is a flowchart of a second embodiment of a method of upgrading a CM of the dongle.

FIG. 5 is a flowchart of a second embodiment of a method of upgrading CM of the dongle. In FIG. 5, the blocks 502, 504, and 506 are same as blocks 402, 404, and 406, respectively.

In block 508, the loading module downloads the u-boot to the dongle. In the present embodiment, the u-boot can suspend the operation of the dongle. When the dongle stops running, the second CM can be upgraded.

In block 510, the loading module generates an instruction to upgrade the second CM when the dongle stops running, then the host upgrades the second CM according to the instruction.

Figure 6:
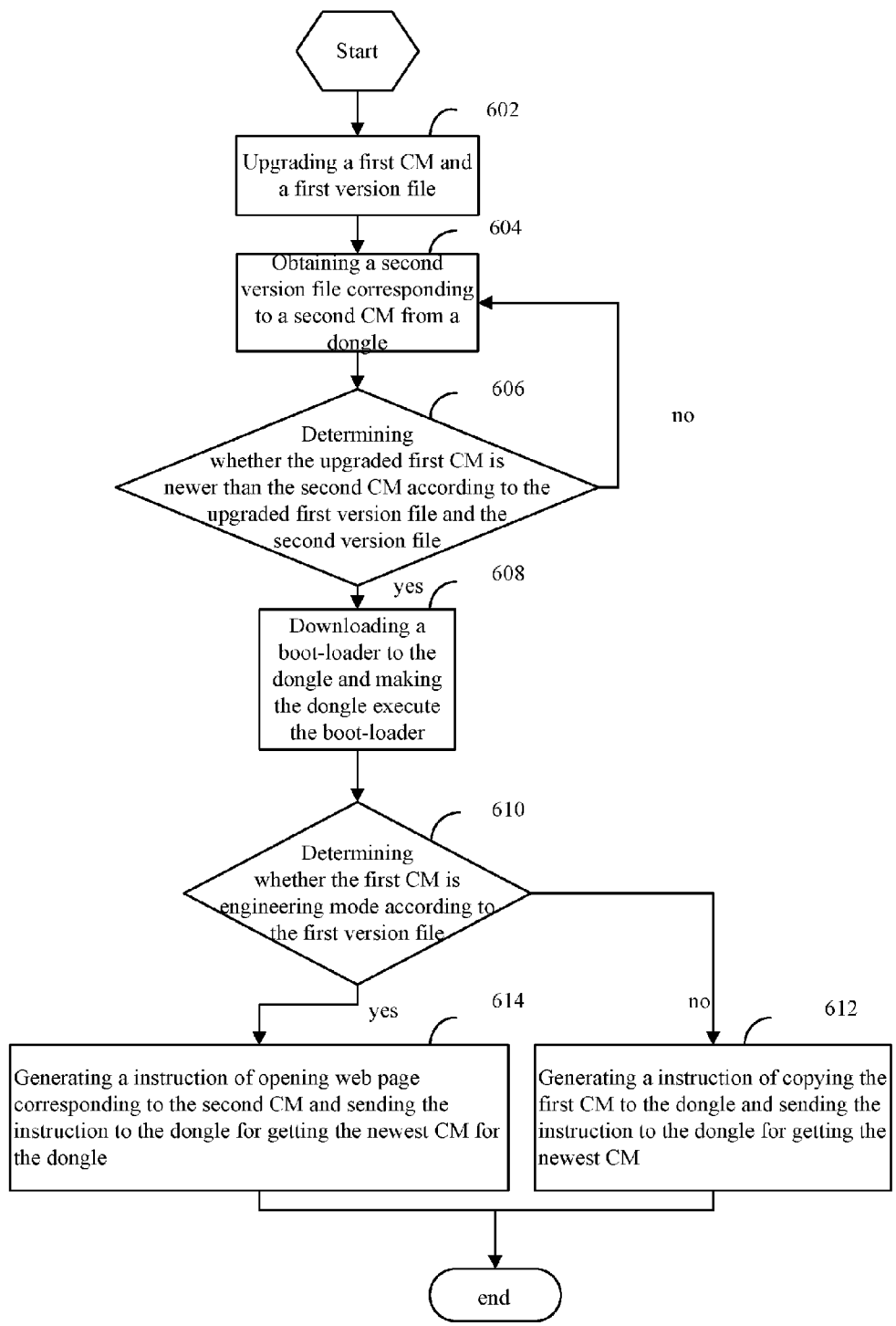
FIG. 6 is a flowchart of a third embodiment of a method of upgrading a CM of the dongle.

FIG. 6 is a flowchart of a third embodiment of a method of upgrading CM of the dongle. In FIG. 6, the blocks 602, 604, 606, and 608 are same as blocks 502, 504,506, and 508, respectively.

In block 610, the loading module determines whether the first CM is an engineer version which is offered to the engineers according to the first version file. In the present embodiment, the first version file comprises the version type of the first CM.

In block 612, when the first CM is not the engineer version, the upgrading instruction is to copy the first CM, then the u-boot copies the first CM to the dongle as the second CM.

In block 614, when the first CM is the engineer version, the upgrading instruction is to open web page corresponding to the first CM or the second CM, then the user can upgrade parts of the second CM selectively from the Internet.

The exemplary method of upgrading the connection manager of a dongle provides different ways to upgrade the connection manager of the dongle based on the version of the connection manager saved in the host.

While various embodiments and methods have been described above, it should be understood that they have been presented by way of example only and not by way of limitation. Thus the breadth and scope of the present disclosure should not be limited by the above-described embodiments, and should be at least commensurate with the following claims and their equivalents.

What is claimed is:

1. A host for connecting to a dongle, comprising at least one processor, a non-transitory storage system storing a first connection manager and one or more programs, and a first version file, wherein the one or more programs is executed by the at least one processor and comprises instructions for:
upgrading the first connection manager and the first version file;
obtaining a second version file which is saved in the dongle, wherein the dongle comprises a second connection manager corresponding to the second version file;
determining whether or not the upgraded first connection manager is newer than the second connection manager according to the upgraded first version file and the second version file;
downloading a universal boot loader to the dongle on condition that the upgraded first connection manager is newer than the second connection manager, wherein the universal boot loader is able to stop the dongle from running;
generating an instruction for upgrading the second connection manager when the dongle stops running; and
upgrading the second connection manager according to the instruction.

2. The host of claim 1, wherein generating an instruction of upgrading the second connection manager further bases on the determination about a version of the first connection manager.

3. The host of claim 2, wherein, when the version of the first connection manger is an engineer version, the instruction of upgrading the second connection manager is to open a web page corresponding to the second connection manager for upgrading parts of the second connection manager.

4. The host of claim 3, wherein, when the version of the first connection manger is not the engineer version, the instruction of upgrading the second connection manager is to copy the upgraded first connection manager to the dongle as the second connection manager.

5. A method of upgrading connection managers for a dongle, applied in a host comprising a first connection manager and a first version file, the method comprising:
upgrading the first connection manager and the first version file;
obtaining a second version file which is saved in the dongle, wherein the dongle comprises a second connection manager corresponding to the second version file;
determining whether or not the upgraded first connection manager is newer than the second connection manager according to the upgraded first version file and the second version file;
downloading a universal boot loader to the dongle on condition that the upgraded first connection manager is newer than the second connection manager, wherein the universal boot loader is able to stop the dongle from running;

generating an instruction for upgrading the second connection manager when the dongle stops running; and upgrading the second connection manager according to the instruction.

6. The method of claim 5, wherein, generating an instruction of upgrading the second connection manager further bases on the determination about a version of the first connection manager.

7. The method of claim 6, wherein, when the version of the first connection manger is an engineer version, the instruction of upgrading the second connection manager is to open a web page corresponding to the second connection manager for upgrading parts of the second connection manager.

8. The method of claim 7, wherein, when the version of the first connection manger is not the engineer version, the instruction of upgrading the second connection manager is to copy the upgraded first connection manager to the dongle as the second connection manager.

* * * * *